US012752611B2

(12) United States Patent
Wells et al.

(10) Patent No.: US 12,752,611 B2
(45) Date of Patent: Oct. 6, 2026

(54) SUNSHADE ASSEMBLIES WITH REDUCED HEIGHT PROFILES

(71) Applicant: Aisin World Corp. of America, Northville, MI (US)

(72) Inventors: Alexander Wells, New Hudson, MI (US); Michael A Mixon, Brighton, MI (US); Glover A Kosch, Ann Arbor, MI (US)

(73) Assignee: AISIN WORLD CORP. OF AMERICA, Northville, MI (US)

( * ) Notice: Subject to any disclaimer, the term of this patent is extended or adjusted under 35 U.S.C. 154(b) by 358 days.

(21) Appl. No.: 18/615,142

(22) Filed: Mar. 25, 2024

(65) Prior Publication Data

US 2025/0296413 A1 Sep. 25, 2025

(51) Int. Cl.
*B60J 7/043* (2006.01)

(52) U.S. Cl.
CPC .................................... *B60J 7/043* (2013.01)

(58) Field of Classification Search
CPC ... B60J 7/0015; B60J 7/003; B60J 7/02; B60J 7/022; B60J 7/043
See application file for complete search history.

(56) References Cited

U.S. PATENT DOCUMENTS

| | | | | |
|---|---|---|---|---|
| 5,238,290 A * | 8/1993 | Farmont | B60J 7/024 | 296/216.03 |
| 5,664,827 A * | 9/1997 | Mori | B60J 10/82 | 296/213 |
| 8,033,584 B2 | 10/2011 | Akizuki et al. | | |
| 2023/0009910 A1 | 1/2023 | Motomura et al. | | |

FOREIGN PATENT DOCUMENTS

| | | |
|---|---|---|
| AU | 7597587 A | 10/1987 |
| CN | 216033668 U | 3/2022 |
| JP | 2987510 B2 | 12/1999 |
| JP | 2023010196 A | 1/2023 |

OTHER PUBLICATIONS

Webasto. "Information Disclosure of Webasto Group Sunshade Bar", dated Mar. 20, 2024. (3 pages).

* cited by examiner

*Primary Examiner* — Huan Le
(74) *Attorney, Agent, or Firm* — Sughrue Mion, PLLC

(57) ABSTRACT

Assemblies and other embodiments described herein relate to a sunshade assembly with a reduced height profile. In one embodiment, a sunshade assembly includes a support bar spanning a width of a vehicle sunroof. The support bar includes 1) a sunshade grip to retain an edge of a sunshade and 2) a slot formed at either end of the support bar. The sunshade assembly further includes a pair of drive shoes to drive the support bar. A drive shoe is positioned within a cavity of the support bar and includes a compliant clip to retain the drive shoe within the slot. The support bar and drive shoes have a height profile disposed below a sunroof seal and glass attachment access region of a sunroof assembly.

20 Claims, 7 Drawing Sheets

SUNSHADE ASSEMBLIES WITH REDUCED HEIGHT PROFILES

TECHNICAL FIELD

The subject matter described herein relates, in general, to sunshade assemblies and, more particularly, to sunshade assemblies that have a height profile to facilitate complete coverage of a sunroof area of a vehicle by a sunshade.

BACKGROUND

Vehicles may be equipped with sunroof assemblies. A sunroof assembly includes a transparent panel formed on the roof of a vehicle. The sunroof assembly, and variations thereof, allow sunlight to pass into the vehicle, providing natural lighting to the occupants of the vehicle cabin. The sunroof assembly also allows the occupants a view of the environment of the vehicle, specifically towards the sky and the environment above the vehicle.

In an example, the sunroof is fixed in a closed state. That is, the sunroof assembly may replace a portion of the roof panel of the vehicle and be rigidly and statically coupled to the vehicle roof panel. In another example, the sunroof may open and close. In one particular example, the sunroof may open about a pivot point or hinge. In another example, the sunroof may entirely open, for example, by translating either forward or backward in a longitudinal direction relative to the vehicle. Accordingly, at the push of a button, an occupant may selectively open the sunroof to let in fresh cool air and/or to ventilate the cabin. When desired, the occupant may selectively close the sunroof, for example when the occupant is to leave the vehicle or in the event of inclement weather. In either case, the sunroof assembly may include a motorized mechanism that opens and closes the sunroof based on user input (e.g., push of a button) or based on any other criteria. In the example of a sliding sunroof, the sunroof assembly may include a guide rail to move the sunroof between 1) an open or extended position and 2) a closed or retracted position.

SUMMARY

In one embodiment, example systems relate to a manner of improving the operation and functionality of a vehicle sunshade. Specifically, the example systems provide a sunshade assembly that facilitates complete, rather than partial, coverage of the sunroof opening. Moreover, the example sunshade assembly does not trigger material removal from a sunshade guide rail to access sunroof attachment devices such as glass screws.

In one embodiment, a sunshade assembly is disclosed. The sunshade assembly includes a support bar spanning the width of a vehicle sunroof. The support bar includes 1) a sunshade grip to retain the edge of a sunshade and 2) a slot formed at either end of the support bar. The sunshade assembly further includes a pair of drive shoes to drive the support bar. A drive shoe is positioned within a cavity of the support bar and comprises a compliant clip to retain the drive shoe within the slot. The support bar and drive shoes have a height profile disposed below a sunroof seal and glass attachment access region of a sunroof assembly.

In one embodiment, a sunshade assembly is disclosed. The sunshade assembly includes a support bar spanning the width of a vehicle sunroof. The support bar includes 1) a sunshade grip to retain the leading edge of a sunshade and 2) a slot formed at either end of the support bar. The sunshade assembly further includes a pair of drive shoes to drive the support bar. A drive shoe is positioned within a cavity of the support bar and comprises a compliant clip to retain the drive shoe within the slot. The support bar and drive shoes 1) have a height profile that is less than ten millimeters (mm) and 2) are disposed below a sunroof seal and glass attachment access region of a sunroof assembly.

In one embodiment, a sunshade assembly is disclosed. The sunshade assembly includes a support bar spanning the width of a vehicle sunroof. The support bar includes 1) a sunshade grip to retain the leading edge of a sunshade and 2) a slot formed at either end of the support bar. The sunshade assembly further includes a pair of drive shoes to drive the support bar. A drive shoe is positioned within a cavity of the support bar and comprises a compliant clip to retain the drive shoe within the slot. The support bar and drive shoes 1) have a height profile that is less than ten mm and 2) are disposed below a sunroof seal and glass attachment access region of a sunroof assembly. The sunshade assembly further includes a guide rail on either side of the support bar to support the movement of the drive shoes. The guide rail has a height profile disposed between the sunroof seal and the glass attachment access region of the sunroof assembly.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
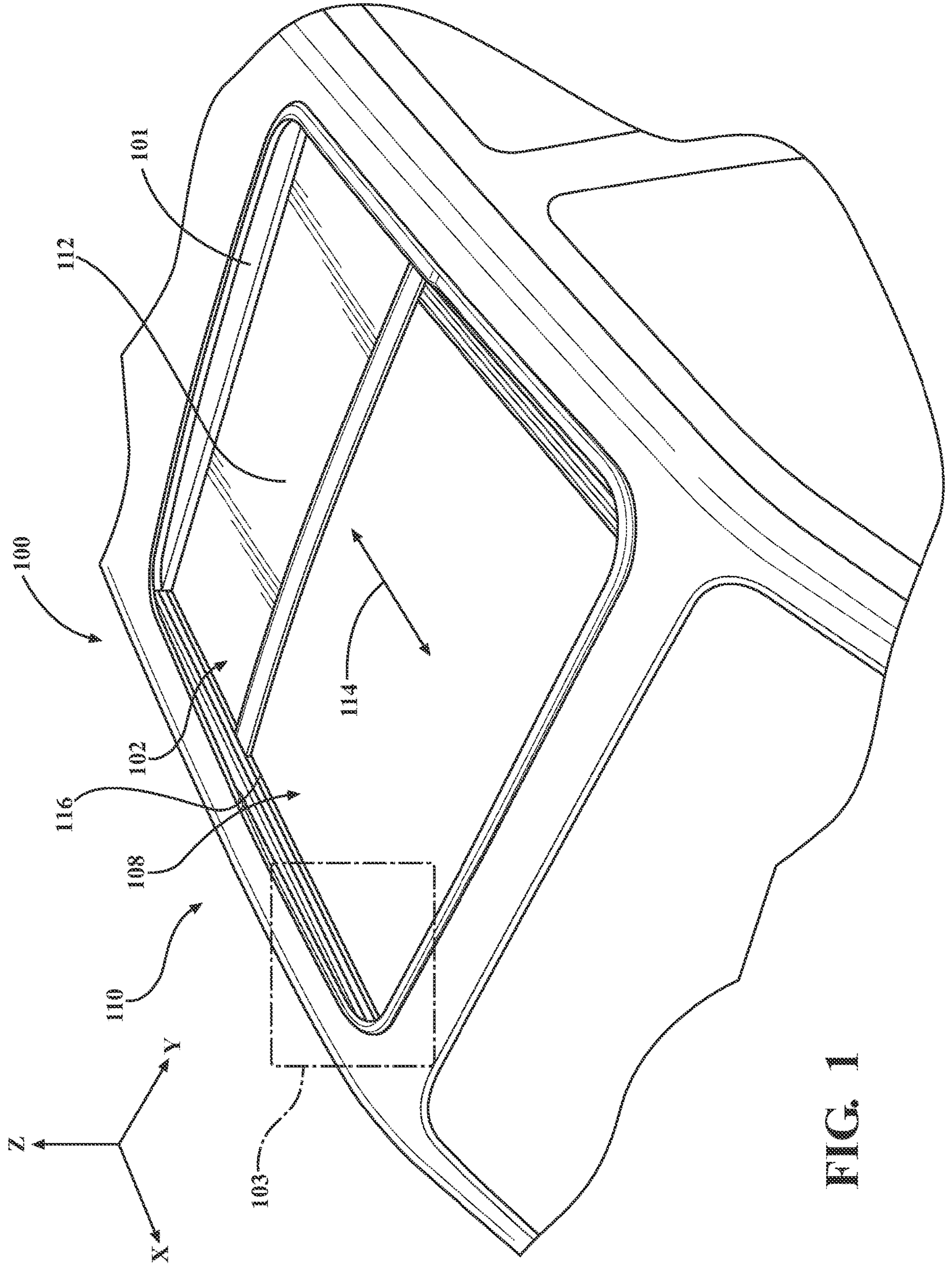
FIG. 1 illustrates one example of a vehicle that includes a sunroof assembly with a sunshade assembly with a reduced height profile.

Systems and other embodiments associated with improving sunshade operation are disclosed herein. As previously described, some vehicles include sunroofs, which include a transparent panel in the roof of a vehicle. The transparent panel allows natural sunlight into the cabin and provides an additional view of the exterior world to occupants in the cabin. However, the natural sunlight may be distracting at times. For example, direct sunlight in a driver's eyes may make it difficult for the driver to see and concentrate on the road in front of them, motorists on the road, and other objects (both dynamic and stationary) in the vicinity of the vehicle. Reduced visibility increases the danger of operating a vehicle. Still further, the glare of direct sunlight on a human-machine interface (HMI), such as an infotainment display or other display, may make the information presented thereon difficult to see. The bright, direct sunlight may also be an annoyance to vehicle occupants.

As such, a vehicle may be equipped with a sunshade on the interior of the cabin that reduces the amount of sunlight entering the vehicle. The sunshade may be retractable to either 1) let in a full amount of sunlight through the sunroof panel or 2) block at least a portion of the sunlight through the sunroof panel. When extended, a sunshade may completely block the light passing through the sunroof panel or partially block the natural light such that some sunlight still passes through the sunshade panel, albeit to a lesser degree. In either case, the sunshade allows a driver to block sunlight that may otherwise make it difficult to see the surrounding environment and/or an HMI.

The sunshade assembly generally includes a support that spans the width (in a transverse direction across the vehicle) of the sunroof panel. A motor and guide rail system operate to unroll or otherwise extend the sunshade in a longitudinal direction relative to the sunroof. As a particular example, when retracted, the sunshade may be rolled behind the sunroof panel in a longitudinal direction. When extended, the sunshade may extend over the length of the sunroof panel.

While the sunshade enhances the driver experience and the safety of motor vehicle travel, additional developments may improve its operation and functionality. For example, the guide rail that defines the movement of the sunshade may be disposed below a seal around the periphery of the sunroof assembly that prevents water or other debris from entering the vehicle through the sunroof assembly. However, if the drive shoe (i.e., a mechanical device attached to the sunshade that imparts motion generated by the actuator to retract and extend the sunshade) is too tall, the sunshade may not be able to slide below the seal. That is, the top surface of the sunshade may be higher (in a vertical or z-direction) than the bottom surface of the seal such that the sunshade may not be able to extend across the entire length of the sunroof area (in a longitudinal direction of the vehicle). Stated another way, the sunshade may not be able to fully extend across the sunroof assembly due to potential interference between the drive shoe of the sunshade assembly and the seal between the vehicle body/sunroof glass. This may result in a region of the sunroof that is unblocked by the sunshade. As such, a band of sunlight may still be able to pass through the sunshade and potentially negatively impact occupant comfort, driver visibility, and display viewability even when the sunshade is fully extended.

As such, the present sunshade assembly has a lower height profile. Specifically, the sunshade assembly, including the support bar, drive shoe, and sunshade fabric, fit entirely below the sunroof seal such that no part of the sunshade assembly has a top edge (in a vertical or z-direction) that would interfere with the seal. As such, the sunshade is able to block the entire area of the sunroof assembly. Specifically, the present sunshade assembly includes a support bar/drive shoe structure with a z-height profile that allows for the positioning of the entire sunshade assembly (including the support bar and drive shoe) below the seal system of the sunroof assembly.

Figure 5:
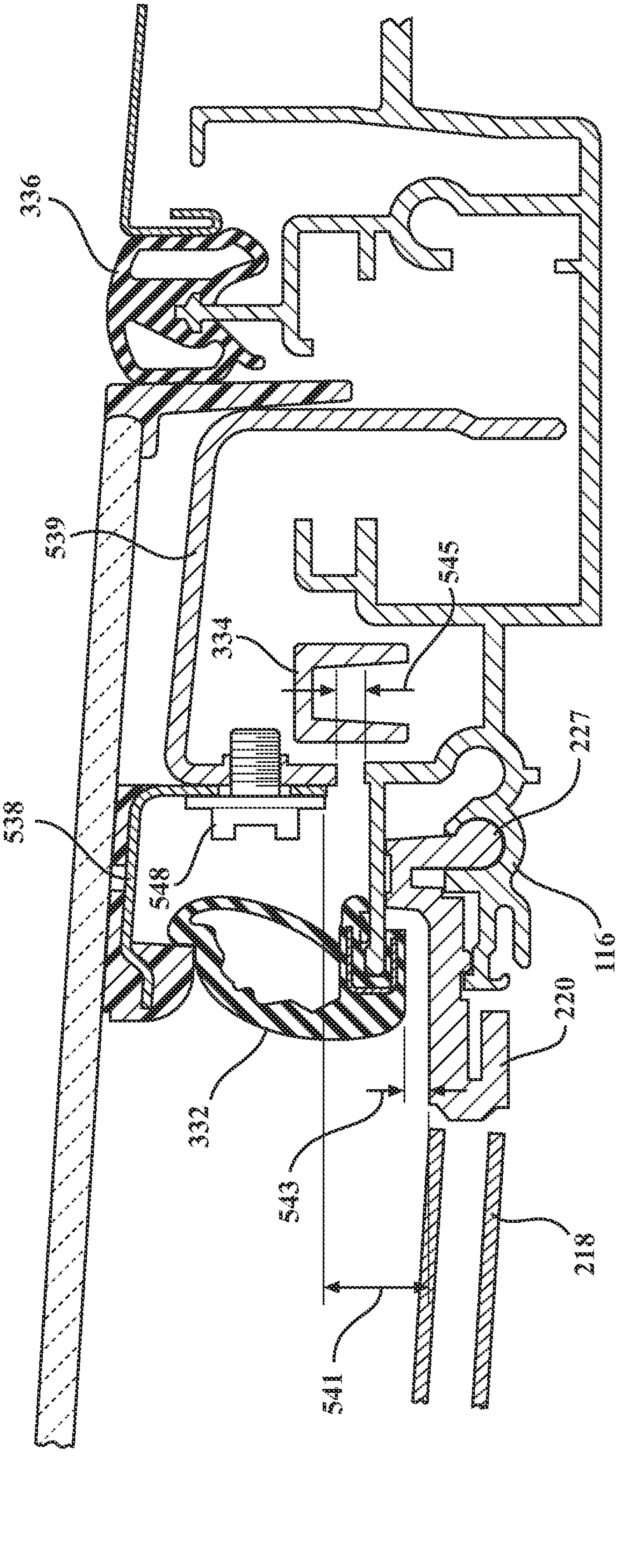
FIG. 5 illustrates a cross-sectional view of a sunroof assembly including a sunshade assembly with a reduced height profile.

The sunshade assembly is also disposed beneath a glass attachment access region. That is, the sunroof panel (e.g., glass pane) may be installed into the sunroof assembly via attachment devices such as screws. These screws may be adjacent to the guide rails in a lateral direction (i.e., on the outside of the guide rails in a vehicle-width direction). In some cases, a guide rail may have an elevated profile to direct the movement of the sunshade drive shoe. However, the elevated profile of the guard rail may impede access to the glass attachment devices, which access may be desirable for repair and/or replacement of the glass panel. Accordingly, in these cases, to provide access to the glass screws, a portion of the guide rail in the region surrounding the glass attachment device may be removed. This process may be complex, time-consuming, costly, and may reduce the structural strength of the guide rail and/or other components of the sunroof assembly. The sunshade assembly of the present specification includes a guide rail with a height profile lower than the glass attachment device access region, as depicted in FIG. 5 below, such that the glass attachment device may be accessed without modification of the guide rail.

Specifically, the sunshade assembly includes a support bar that spans the width of the vehicle sunroof in a lateral direction relative to the vehicle. The support bar includes 1) an attachment mechanism for the sunshade and 2) a slot formed at either end of the support bar. That is, the support bar includes a first slot at a first end and a second slot at the second end. The support bar and attached sunshade are translated via a pair of drive shoes coupled to the support bar. Specifically, the drive shoes are coupled to a motor, which translates the shoes within the guide rails. A portion of the drive shoe that is exterior to the guide rails fits into the support bar via the respective support bar slots at either end. The drive shoe is positioned within the cavity of the support bar and includes a compliant clip to hold the drive shoe within the support bar. Thus, as the actuator moves the drive shoes, the drive shoes move the support bar and unroll or otherwise extend the sunshade coupled to the support bar.

In an example, the height profile of the drive shoe and the support bar may be less than ten millimeters (mm) so as to be disposed below a sunroof seal and glass attachment access region of the sunroof assembly. In this way, the disclosed sunshade assembly exhibits improved efficacy by being able to block the entire region within the boundaries of the sunroof assembly rather than just a portion of the region. Specifically, the smaller z-height sunshade assembly allows the support bar and the drive shoe to be positioned entirely below the closeout sunroof seal and the glass attachment device access region. As such, the sunshade may traverse beyond the longitudinal borders of the sunroof panel as defined by the seal that surrounds the sunroof panel, without colliding with any portion of the seal that surrounds the sunroof panel. Moreover, the reduced height of the guide rail and sunshade assembly does not trigger any milling process of the guide rail or closeout seal flange to gain access to the glass attachment devices.

Turning to the figures, FIG. 1 illustrates a portion of a perspective view of a vehicle 100, including a sunshade assembly 102 with a reduced height profile. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a sunshade assembly 102 that is implemented to improve sunshade coverage and driver/occupant comfort and visibility.

In this description, uses of "front," "forward," and the like, and uses of "rear," "rearward," and the like, refer to the longitudinal directions of the vehicle. "Front," "forward," and the like refer to the front (fore) of the vehicle, while "rear," "rearward," and the like refer to the back (aft) of the vehicle. Uses of "side," "sideways," "transverse," and the like refer to the lateral directions of the vehicle. Uses of "above," "below," and the like refer to the vertical directions of the vehicle.

The vehicle 100 includes an exterior and a number of interior compartments. The compartments include, for example, a passenger compartment, an engine compartment, a cargo area, and the like. The vehicle 100 includes a body that forms the exterior and defines or otherwise encloses the compartments. In one arrangement, the body includes sides, a roof, a floor, a front end, a rear end, and the like. The body may be constructed from a combination of rigidly interconnected frame members, panels, and other body elements, as well as a combination of overlying paneling, trim, upholstery, and other body coverings. In some instances, the body elements have a combination of fabricated, bent, stamped, extruded, cast, molded, and like constructions and are made from a combination of metallic, polymeric, and like materials.

The roof extends laterally between the sides of the vehicle 100. As described above, the vehicle 100 may include a sunroof assembly 110. As described above, the sunroof assembly 110 may include a sunroof panel 101 that is fixed or retractable. In the example depicted in FIG. 1, the sunroof panel 101 is retractable and depicted in a retracted position for ease of illustration of other components. In other examples, the sunroof panel 101 may be permanently closed but transparent. In either example, the sunshade assembly 102 may be disposed underneath the sunroof panel 101. That is, the sunshade assembly 102 may be on the interior of the vehicle 100 as defined by the sunroof panel 101.

The sunroof assembly 110 may be installed in and attached to the roof of the vehicle 100. That is, the vehicle body may include one or more components to support the roof panels, sunroof assembly 110, and sunshade assembly 102. For example, the body may include roof rails, a roof header, and a frame that surround the sunroof panel 101. In one arrangement, the roof rails are laterally spaced apart from one another about the sunroof panel 101 and extend longitudinally down the vehicle 100 in a longitudinal direction 114. The roof panel may extend longitudinally from the roof header and laterally between the roof rails.

In general, the sunroof assembly 110 includes the sunroof panel 101 and associated components that open and close the sunroof panel 101. As used herein, the term "sunroof panel" includes similar roof openings for vehicles 100, including moonroofs, panoramic roofs, etc. As described above, the sunroof panel 101 allows sunlight and/or air into the cabin of the vehicle 100 and allows the occupants of the vehicle 100 to view the surrounding environment. As such, the sunroof panel 101 may be made from a material that may 1) enclose the cabin and 2) allow an occupant in the vehicle 100 to see outside the vehicle 100 when the sunroof panel 101 is closed. In one example, the sunroof panel 101 is made of glass, but it should be understood that the sunroof panel 101 may be made of one or more other materials.

In one arrangement, the sunroof assembly 110 includes a housing that houses various components of the sunroof assembly 110, including those components that attach the sunroof panel 101 to the vehicle 100. The housing may be attached to the roof header and/or other components of the vehicle 100.

As described above, the vehicle 100 may also include a sunshade assembly 102, which includes a sunshade 112 and various other components to move the sunshade 112 and attach the sunshade 112 to the vehicle 100. In general, the sunshade 112 is formed of a flexible sun-blocking material such as a fabric. The sunshade 112 may entirely or partially block the sunlight. For example, the sunshade 112 may be made of an opaque material that completely blocks sunlight when extended. In another example, the sunshade 112 may partially block the sunlight such that a portion of the sunlight may still transmit through the sunshade 112 to, at least partially, infiltrate the cabin.

In an example, the sunshade 112 is retractable to be selectively moved into position underneath the sunroof panel 101. In one particular example, the sunshade 112, when stowed, is rolled in a storage compartment behind the and/or underneath the sunroof assembly 110. In the example depicted in FIG. 1, the sunshade 112 is extended while the sunroof panel 101 is retracted.

As described above, the sunshade assembly 102 includes additional components that facilitate the storage, movement, and attachment of the sunshade 112 to the vehicle 100. Specifically, the sunshade assembly 102 includes additional components such as a support bar and drive shoe, as depicted in FIG. 2. As described below, the drive shoe and support bar support the movement, either motorized or manually, of the sunshade 112 from a retracted to an extended position.

A pair of guide rails 116 are positioned at the lateral edges of the sunroof opening 108 and serve to guide the sunshade 112 as it longitudinally traverses the sunroof panel 101 in a longitudinal direction 114. FIG. 1 depicts one guide rail 116, while a second guide rail is obscured by the sunroof assembly 110. Drive shoes of the sunshade assembly 102 (as depicted in FIG. 2) are seated within respective guide rails 116 and are driven by an actuator or manual user input to open and close the sunshade 112. In an example, the actuator includes a motor coupled to cables. The cables are coupled to respective drive shoes within respective guide rails 116. Accordingly, in one mode, the motor draws the cables in, which may retract or extend the sunshade 112 based on where the motor is located relative to the sunshade 112. In another mode, the motor extends the cables, which may retract or extend the sunshade 112 based on where the motor is located relative to the sunshade 112. In still further modes, the sunshade assembly 102 may be manual in that an occupant of the vehicle 100 manually opens or closes the sunshade 112, for example, via a handle clip of the sunshade assembly 102. In either case, the drive shoes slide within the guide rails 116 to guide the sunshade 112 between a retracted and extended state.

Figure 2A:
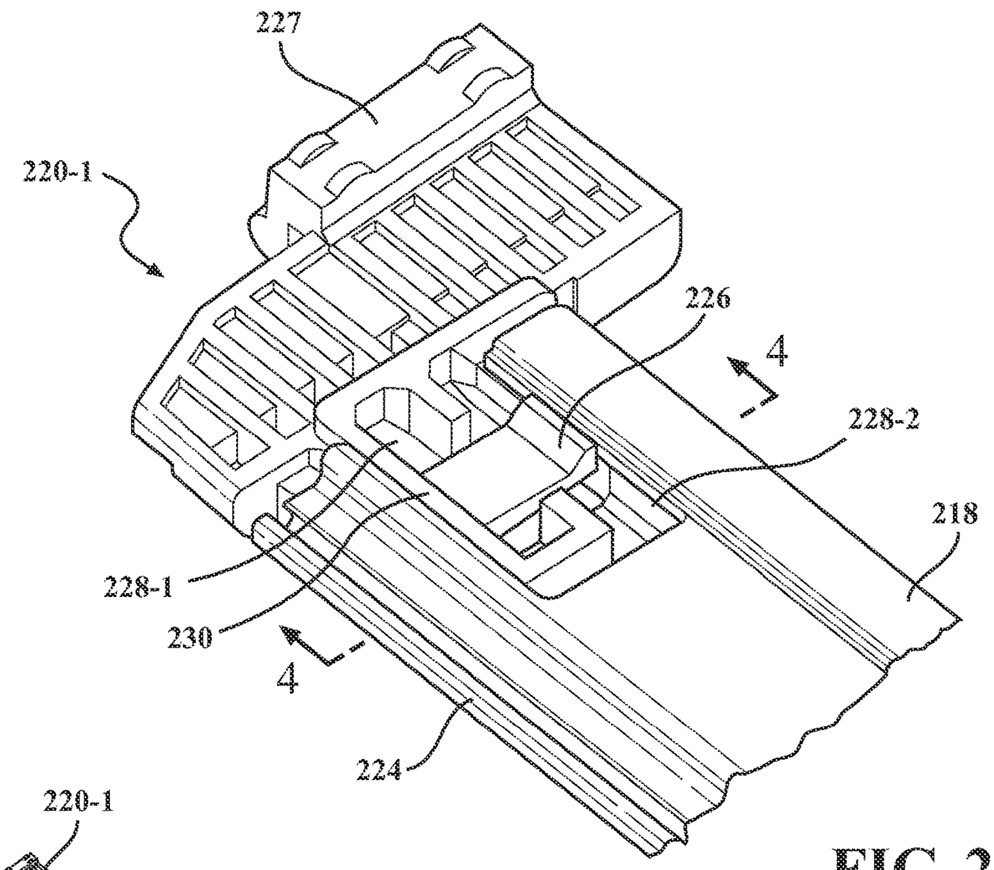
FIGS. 2A and 2B illustrate an isometric view of a support bar and drive shoe of a sunshade assembly with a reduced height profile.
Figure 2B:
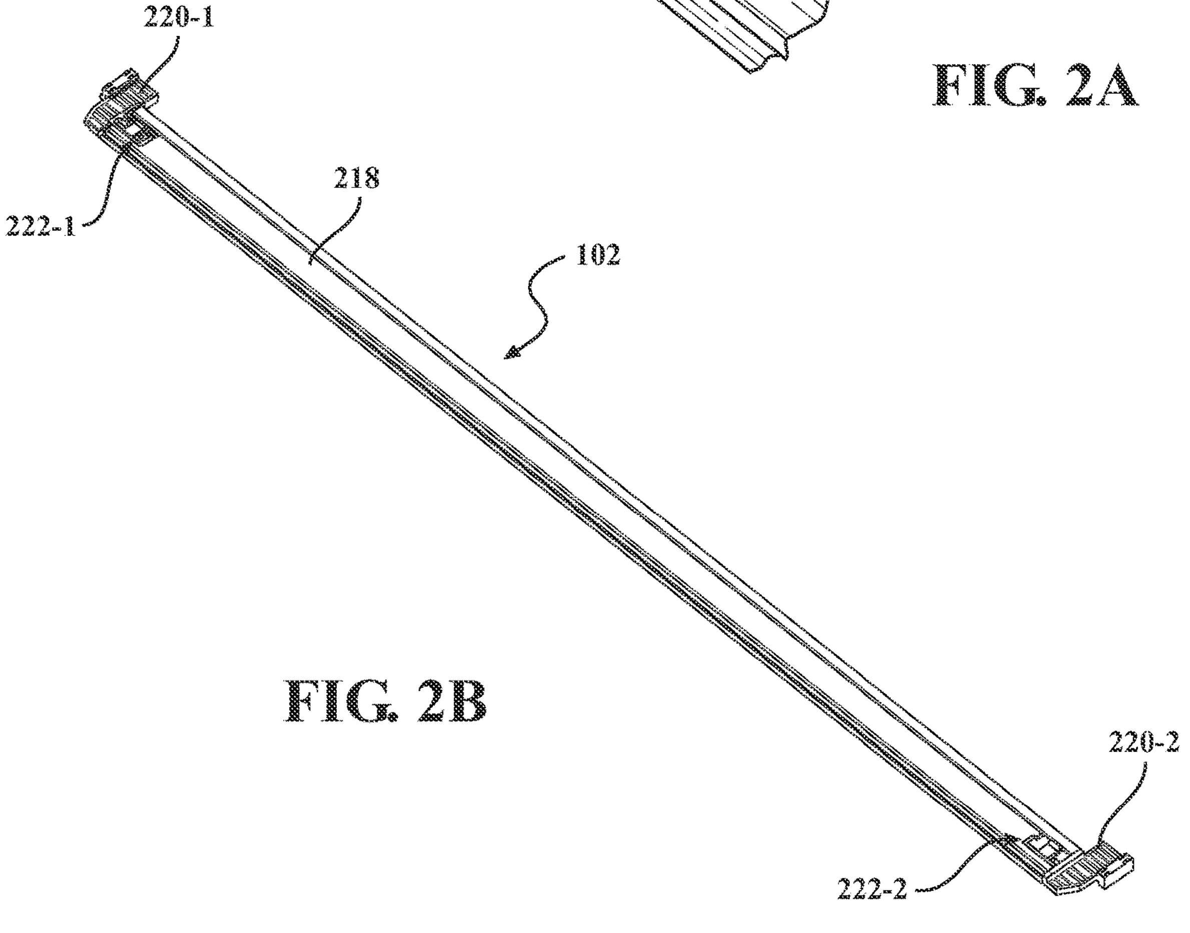

FIGS. 2A and 2B illustrate an isometric view of the sunshade assembly 102 with a reduced height profile. Specifically, FIG. 2A depicts a zoomed-in partially broken away view of an end of the support bar 218 with a drive shoe 220-1 installed therein and FIG. 2B depicts an entire support bar 218 with drive shoes 220-1 and 220-2 installed in each end. In an example, the sunshade assembly 102 is a component of the sunroof assembly 110. For example, the sunroof assembly 110, which includes the sunshade assembly 102, may be installed as a single component within the vehicle 100. In general, the sunshade assembly 102 includes 1) a support bar 218 that spans the width of the vehicle sunroof and 2) a pair of drive shoes 220-1 and 220-2 that drive the support bar 218.

Figure 4:
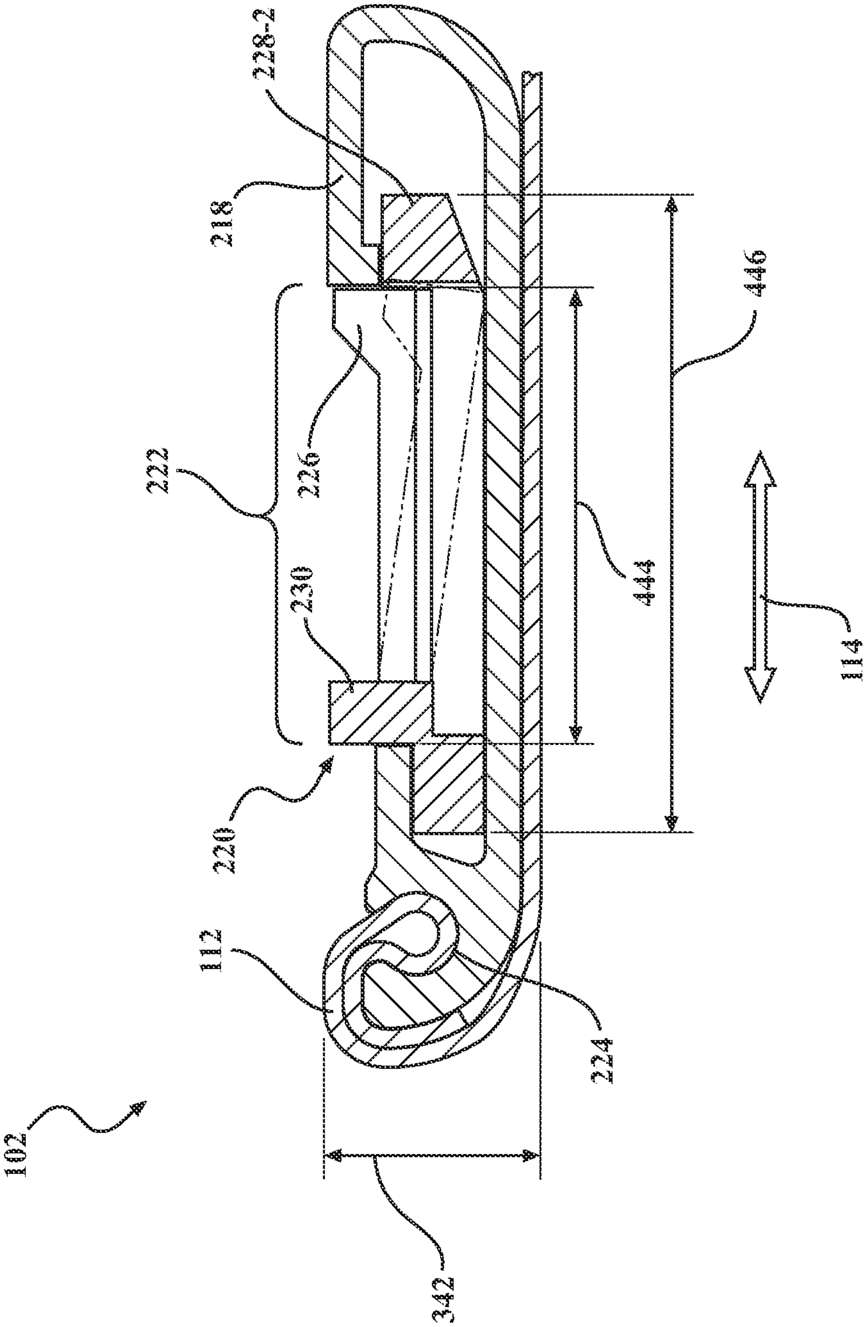
FIG. 4 illustrates a cross-sectional view of the sunshade assembly with a reduced height profile.

The support bar 218 extends between the lateral sides of the sunroof assembly 110 and, more particularly, between the guide rails 116. The support bar 218 supports the weight of the sunshade 112 and draws the sunshade 112 between an extended and retracted position. Specifically, the support bar 218 may be formed of a rigid material (such as extruded aluminum, another form of metal, or any other material) and may grip a leading edge of the sunshade 112 to draw it forward or backward to extend or retract the sunshade 112. As such, the support bar 218 includes a sunshade grip 224 that retains the leading edge of the sunshade 112. In an example, the sunshade grip 224 may be a slot that receives a looped end of the sunshade 112, as depicted in FIG. 4 below. In an example, a rigid rod may be placed in the looped end of the sunshade 112 to aid in rigidly attaching the sunshade 112 to the support bar 218. As the sunshade 112 is coupled to the support bar 218, movement of the support bar 218 by the actuator and drive shoes 220 results in extension, or retraction, of the sunshade 112. While FIG. 2 depicts a particular type of sunshade grip, the support bar 218 may include other types of sunshade grips.

FIG. 2A illustrates the support bar 218 with a slot 222 formed at either end of the support bar 218. As depicted in FIG. 4, the slot 222 is to receive and retain a respective drive shoe 220. Specifically, a first slot 222-1 may be formed at a first end of the support bar 218 to receive a first drive shoe 220-1, while a second slot 222-2 may be formed at a second end of the support bar 218 to receive a second drive shoe 220-2. With the exception of these slots 222, the support bar 218 may have a closed profile. That is, the support bar 218 may have a continuous cross-sectional profile. Doing so may add rigidity to the support bar 218. Were the support bar 218 not a closed profile, the support bar 218 may deflect or otherwise deform under the forces present when extending the sunshade 112, particularly at locations (such as the center of the support bar 218) that are far from the attachment points of the support bar 218 to the guide rails 116. In an example, the slots 222-1 and 222-2 are formed on a vertical surface of the support bar 218 such that the drive shoes 220-1 and 220-2 are slid into the slot 222 through the vertical surface of the support bar 218 as depicted in FIGS. 6A-6F below.

Figure 3A:
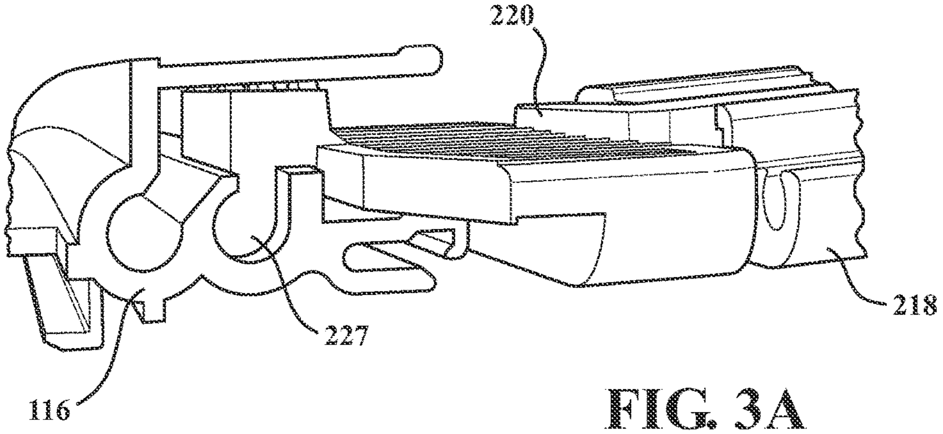
FIGS. 3A and 3B illustrate partially broken away perspective section views of a sunroof assembly with a sunshade assembly with a reduced height profile installed therein.
Figure 3B:
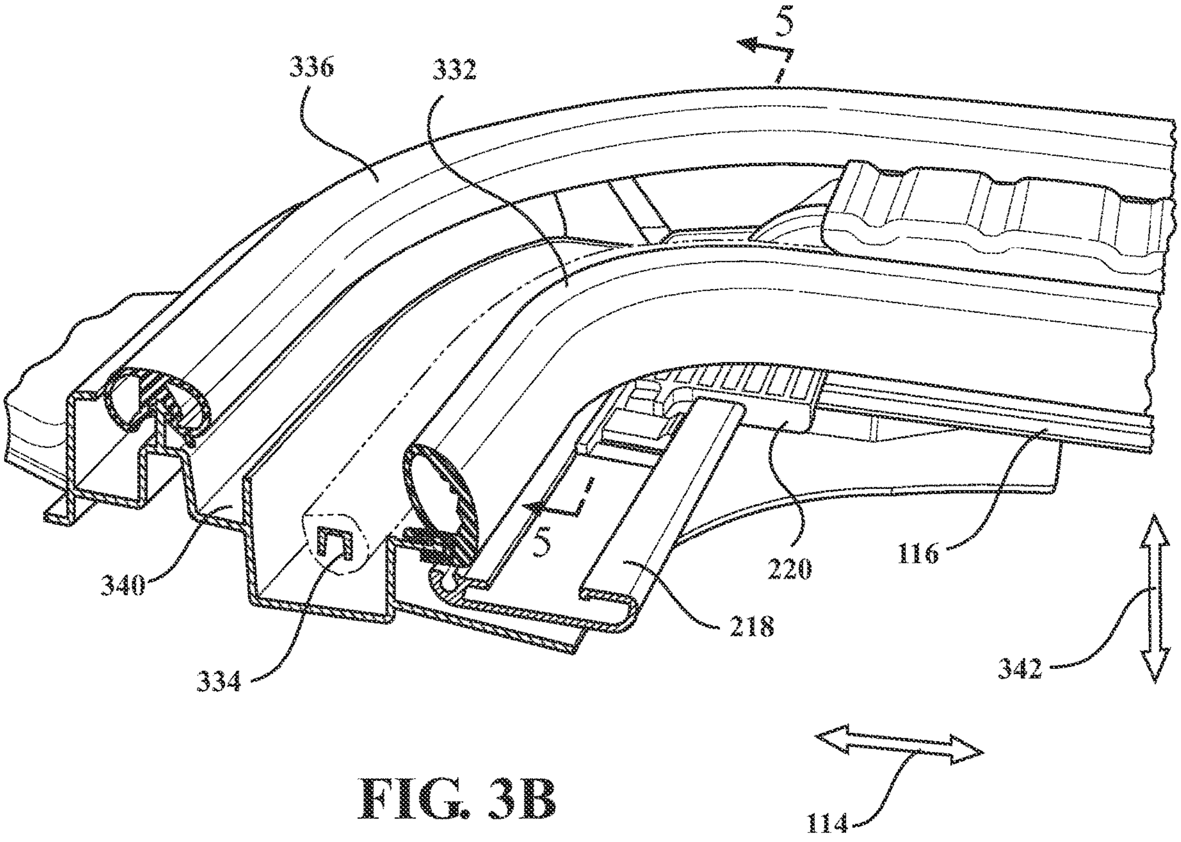

The sunshade assembly 102 further includes a pair of drive shoes 220-1 and 220-2 that drive the support bar 218. By driving the support bar 218, the drive shoes 220-1 and 220-2 drive the sunshade 112 coupled to the support bar 218. As described above, each drive shoe 220-1 and 220-2 includes a portion 227 which 1) resides in the guide rails 116. In the example where the sunshade 112 is motor-operated, this portion 227 of the drive shoe 220 may be coupled to the actuator. Even when not motor-operated, i.e., when manually-operated, the drive shoes 220 traverse within the guide rails 116 in a longitudinal direction 114 of the vehicle 100 to extend and retract the sunshade 112. As depicted in FIGS. 2A, 3B, and 3A, the body of the drive shoe 220 is positioned within a cavity of the support bar 218. In this fashion, the height profile of the sunshade assembly 102 is reduced as the drive shoe 220 and the support bar 218 occupy the same vertical space.

The drive shoe 220 includes various components that facilitate a low z-height profile coupling of the drive shoe 220 to the support bar 218. Specifically, the drive shoe 220 includes a compliant clip 226 that retains the drive shoe 220 within the slot 222. During installation, as depicted in FIGS. 6A-6F, the compliant clip 226 deflects to allow the body of the drive shoe 220 to be inserted into the cavity of the support bar 218. When the drive shoe 220 is seated within the cavity of the support bar 218, the compliant clip 226 rests against the surface of the slot 222 to prevent movement of the drive shoe 220 relative to the support bar 218 in a longitudinal direction 114 as depicted in FIG. 4.

The drive shoe 220 includes a base surface, which may be divided into side portions 228-1 and 228-2. In one example, the compliant clip 226 is positioned between the side portions 228-1 and 228-2. A rib 230 vertically extends from the base surface. The rib 230 interfaces with a leading surface of the slot 222 to retain the drive shoe 220 in place when the drive shoe 220 is seated in the cavity of the support bar 218. In this example, the compliant clip 226 is attached to and extends perpendicularly away from the rib 230 towards a trailing surface of slot 222. FIG. 4 below depicts the interface of the drive shoe 220 components with the support bar 218 to provide a rigid connection. The drive shoes 220 may be formed from various materials, including an injection molded resin or any other material.

FIGS. 3A and 3B illustrate partially broken away perspective section views of a sunroof assembly 110 with a sunshade 112 with a reduced height profile installed therein. Specifically, FIG. 3B depicts a zoomed-in view of the region of the sunshade assembly 102 depicted in the dashed box 103 depicted in FIG. 1 and FIG. 3A depicts an even further zoomed-in view of the region.

As described above, in an example, the sunshade assembly 102 is a part of the sunroof assembly 110, which sunroof assembly 110 is installed as a single component into the roof of the vehicle 100. The sunroof assembly 110 includes multiple additional components such as a sunroof panel 101, installation components, and other features that facilitate user comfort and operation of the sunroof panel 101. For example, the sunroof assembly 110 may include a front housing 340 on which multiple sunroof assembly 110 components may be installed. Examples of such components include a weatherstrip 336, a wind deflector 334 (in a closed position), and a sunroof seal 332.

The sunroof seal 332 is compressed between the sunroof panel 101 and the front housing 340 to provide a barrier between the outside environment and the vehicle cabin. The sunroof seal 332 may be formed of an elastically deformable material such as rubber and may form a closed-profile shape. The sunroof panel 101 sits on top of the sunroof seal 332 and compresses the sunroof seal 332 to form an air and water-tight sealed interface to the vehicle 100 to prevent water and debris from entering the vehicle 100. As described above, a drive shoe with a too tall profile may interfere with the sunroof seal 332, which may prevent complete coverage of the sunroof opening 108 by the sunshade 112.

FIGS. 3A and 3B also depict features of the sunshade assembly 102, such as one of the guide rails 116, one of the drive shoes 220, and the support bar 218. As described above, the drive shoe 220 includes a portion 227 that sits within a slot of the guide rail 116 and is moved within the guide rail 116 by an actuator or manual intervention. The drive shoe 220 also includes a body that fits within the support bar 218, which support bar 218 has a sunshade grip 224 that retains the leading edge of the sunshade 112 and moves in the longitudinal direction 114 to cover/uncover the sunroof opening 108.

The sunshade assembly 102 has a z-height profile that allows it to sit completely below the sunroof seal 332. Were the sunshade assembly 102 too tall (i.e., overlap in the z-direction 342) with the sunroof seal 332), the sunshade 112 may not be able to fully cover the area encompassed by the sunroof opening. For example, were the top surface of the drive shoe 220 at a greater z-height than the bottom surface of the sunroof seal 332, the drive shoe 220 may strike a corner or end portion of the sunroof seal 332 before passing the longitudinal boundary of the sunroof panel 101. This may result in a gap between the longitudinal boundary of the sunroof panel 101 and the sunshade 112. Sunlight may be able to pass unblocked through this gap, which, as described above, could negatively impact occupant comfort and/or driver visibility.

As such, the sunshade assembly 102, and more particularly the drive shoe 220 and the support bar 218 have a short height profile, e.g., under 10 mm (as depicted in FIG. 4), such that the sunshade assembly 102 may completely pass under the sunroof seal 332 (as depicted in FIG. 5). Put another way, the sunshade assembly 102 has a height profile in the z-direction 342 that does not overlap with the height profile of the sunroof seal 332 such that the sunshade 112 may traverse a path that is greater than the entire length of the sunroof assembly 110 (underneath the sunroof seal 332). By extending beneath the entire length of the sunroof panel 101, the sunshade 112 can cover the entire sunroof panel 101 when fully extended.

FIG. 4 illustrates a cross-sectional view of the sunshade assembly 102 with a reduced height profile. Specifically, FIG. 4 is a cross-sectional view taken along the line 4-4 in FIG. 2. FIG. 4 depicts the support bar 218 with the drive shoe 220 seated within the slot 222.

As described above, the support bar 218 includes a sunshade grip 224 that retains the leading edge of a sunshade 112. In an example, the leading edge of the sunshade 112 may include a folded-over portion that fits within the sunshade grip 224. The folded-over portion may have a thickness greater than the opening to the sunshade grip 224, preventing the folded-over portion from separating from the support bar 218. As depicted in FIG. 4, in some examples, the sunshade grip 224 is along the front edge of the support bar 218, with the sunshade 112 covering the front and underside portion of the support bar 218. While particular reference is made to a particular type of sunshade grip 224, the support bar 218 may include different types of sunshade grips 224 that retain and support the movement of the sunshade 112.

FIG. 4 also clearly depicts the z-direction 342 height of the sunshade assembly 102. As described above, were the sunshade assembly 102 taller, the top edge of the support bar 218, and/or the drive shoe 220 may collide with the bottom edge of the front/corner portion of the sunroof seal 332. This collision may prevent the sunshade 112 from fully covering the sunroof panel 101 region. Accordingly, by placing the drive shoe 220 within the cavity of the support bar 218, the z-direction 342 height of the sunshade assembly 102 may be kept low. For example, the height profile of the support bar 218 and the drive shoe 220 may be less than ten millimeters (mm) and may be greater than 7 mm. As a specific example, the height profile of the support bar 218 and the drive shoe 220 may be 7.5 millimeters. The z-direction 342 height of the support bar 218, drive shoe 220, and the sunshade 112 fabric wrapped around such may also be less than 10 millimeters, for example, 8.2 millimeters. This low-profile sunshade assembly 102 falls below and does not overlap in the z-direction with the sunroof seal 332, as depicted in FIG. 5.

FIG. 4 also depicts the relative lengths, in the longitudinal direction 114 of the drive shoe 220 and the support bar 218 components. As described above, the drive shoe 220 may include 1) a base surface formed of side portions 228-1 and 228-2, 2) a rib 230 extending vertically from the base surface, and 3) a compliant clip 226 extending perpendicularly away from the rib 230 parallel to the base surface and towards a trailing edge of the slot 222. In an example, the base surface may be longer than the slot 222 in a longitudinal direction. That is, the length 444 of the base surface is greater than the length 446 of the slot 222. In an example, the length 446 of the slot 222 may be between 16 and 19 mm. For example, the length 446 of the slot 222 may be 17.7 mm. As such, the drive shoe 220 is not vertically translated into the slot 222 but is rather rotated into the slot 222 during installation, as depicted in FIGS. 6A-6F.

FIG. 4 also depicts the compliant clip 226, which, as described above, 1) deflects to allow insertion of the drive shoe 220 into the support bar 218 and 2) stabilizes the drive shoe 220 within the slot 222 in the longitudinal direction 114 when fully seated. In an example, the compliant clip 226 may deflect between 1.5 and 3 mm. For example, the compliant clip may deflect 2.1 mm. That is, as depicted in FIGS. 6A-6F, the compliant clip 226 is elevated from the side portions 228-1 and 228-2 of the base of the drive shoe 220. During installation, a technician or other individual presses the compliant clip 226 from an undeflected position (indicated in solid line) to a deflected position (indicated in dashed line) such that it fits within the cavity of the support bar 218, as depicted in FIG. 4. A user may then rotate the drive shoe 220 to position such within the cavity of the support bar 218 as depicted in FIGS. 6A-6F. When seated, the rib 230 and the compliant clip 226 together prevent the drive shoe 220 movement with respect to the support bar 218 in the longitudinal direction 114. That is, the compliant clip 226 deflects under the trailing surface of the slot 222 within the cavity of the support bar 218 during installation and rests against the trailing surface of the slot 222 when seated in the support bar 218. Specifically, the rib 230 interfaces with a leading edge of the slot 222 while the trailing surface of the compliant clip 226 interfaces with the trailing edge of the slot 222. In this fashion, the drive shoe 220 is prevented from longitudinally translating within the support bar 218.

FIG. 5 illustrates a cross-sectional view of a sunroof assembly 110 including a sunshade assembly 102 with a reduced height profile. Specifically, FIG. 5 depicts a cross-sectional view of the vehicle sunroof assembly 110 taken along the line 5-5 in FIG. 3B. FIG. 5 depicts various components of the sunroof assembly 110, such as the weatherstrip 336, deflector 334, and sunroof seal 332. FIG. 5 also depicts the glass frame 538 to which the sunroof panel 101 is attached. Specifically, the glass frame 538 is coupled to a bracket 539 of the sunroof assembly 110, which bracket 539 is rigidly coupled to a frame of the sunroof assembly 110.

As described above, the drive shoe 220 includes a portion 227 that rests and slides in a groove of a guide rail 116. If the guide rail 116 is too tall, or if the sunshade assembly 102 is too tall, either element may interfere with the access to a glass attachment device 548, such as a glass screw. That is, at some point in time, it may be desirable to repair and/or replace the sunroof panel 101. The sunroof panel 101 may be held in place by a number of glass attachment devices 548 between the glass frame 538 and a bracket 539. To remove the sunroof panel 101, a technician removes glass attachment devices 548 with a tool, such as a screwdriver. While the sunroof seal 332 may be pressed down to provide access to the glass attachment device 548, a drive shoe 220, support bar 218, and guide rail 116, which are formed of a rigid material, may not be able to be moved to provide access to the glass attachment device 548. Thus, a guide rail 116 and sunshade assembly 102 with too high a profile may impede access to the glass attachment devices 548 by a tool such as a screwdriver.

In some cases where the guide rail 116 profile is too tall, localized material of the guide rail 116 may be removed during sunroof assembly 110 manufacturing to facilitate access to the glass attachment device 548. That is, a portion of at least a vertical wall of the guide rail 116 may be removed. This increases the manufacturing and assembly complexity and cost of the sunroof assembly 110. Moreover, removing material may compromise the structural integrity of the guide rail 116.

Accordingly, the sunshade assembly 102 of the present specification has a height that is less than 10 mm. This facilitates mounting of the sunshade assembly 102 at a location relative to the glass attachment device 548 so as not to impede the access to the glass attachment device 548 as depicted in FIG. 5. Specifically, the sunshade assembly 102 may be mounted within the sunroof assembly 110 such that there is a gap 541 between the glass attachment access region and the support bar 218 of at least 8.0 mm. For example, the gap 541 may be 10.6 mm.

As described above, the sunshade assembly 102 is also mounted below the sunroof seal 332. Specifically, the sunshade assembly 102 may be mounted within the sunroof assembly 110 such that there is a gap 543 between the bottom surface of the sunroof seal 332 and a portion of the drive shoe 220 that is outside of the guide rail 116 of at least 2.0 mm. For example, the gap 543 may be 2.6 mm.

Moreover, the guide rails 116 themselves, which as described above may be positioned on either side of the support bar 218 to support the movement of the drive shoes 220, may have a height profile that is also disposed beneath the sunroof seal 332 and the glass attachment access region of the sunroof assembly 110. This facilitates mounting of the guide rails 116 at a location relative to the glass attachment device 548 so as not to impede access to the glass attachment device 548, as depicted in FIG. 5. This also avoids complex, costly, and strength-reducing removal of guide rail 116 material. Specifically, the guide rail 116 may be mounted within the sunroof assembly 110 such that there is a gap 545 between the guide rail 116 and the glass attachment device 548 of at least 2.0 mm. For example, the gap 545 may be 2.8 mm.

Figure 6A:
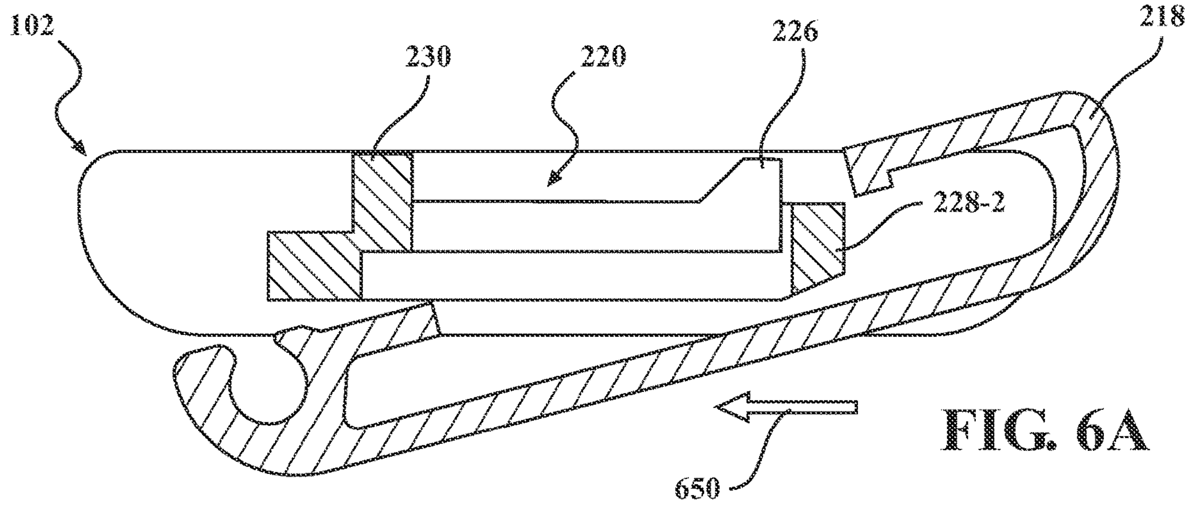
FIGS. 6A-6F illustrate the installation of a drive shoe in a support bar of the sunshade assembly with a reduced height profile.

FIGS. 6A-6F illustrate the installation of a drive shoe 220 in a support bar 218 of the sunshade assembly 102. As described above, the base section of the drive shoe 220 is longer than the slot 222 such that the drive shoe 220 will not translate through the slot 222 to fit within the cavity of the support bar 218. Accordingly, as depicted in FIG. 6A, the support bar 218 is angled relative to the drive shoe 220, which drive shoe 220 is positioned in the guide rail 116. In this position, the trailing edge of the base section of the drive shoe 220 may pass into a rearward section of the support bar 218 cavity when the support bar 218 is translated as indicated by the first arrow 650.

Figure 6B:
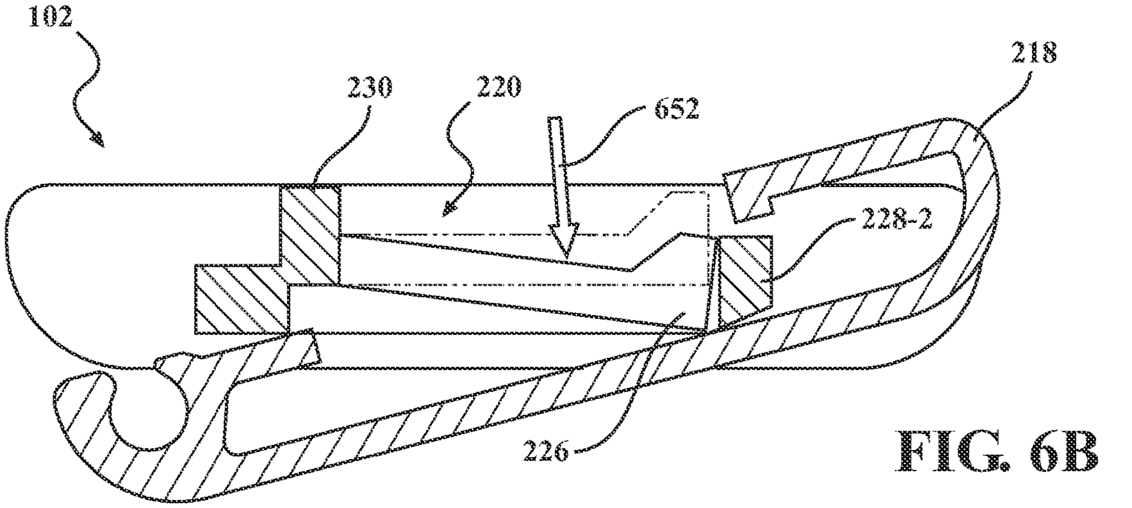

As depicted in FIG. 6B, the compliant clip 226, if not deflected, may prevent full insertion of the drive shoe 220 into the cavity of the support bar 218. Accordingly, a technician or other user may depress the compliant clip 226, as depicted in FIG. 6B with a force in the direction of the second arrow 652, such that the compliant clip 226 may fit within the support bar 218 cavity.

Figure 6C:
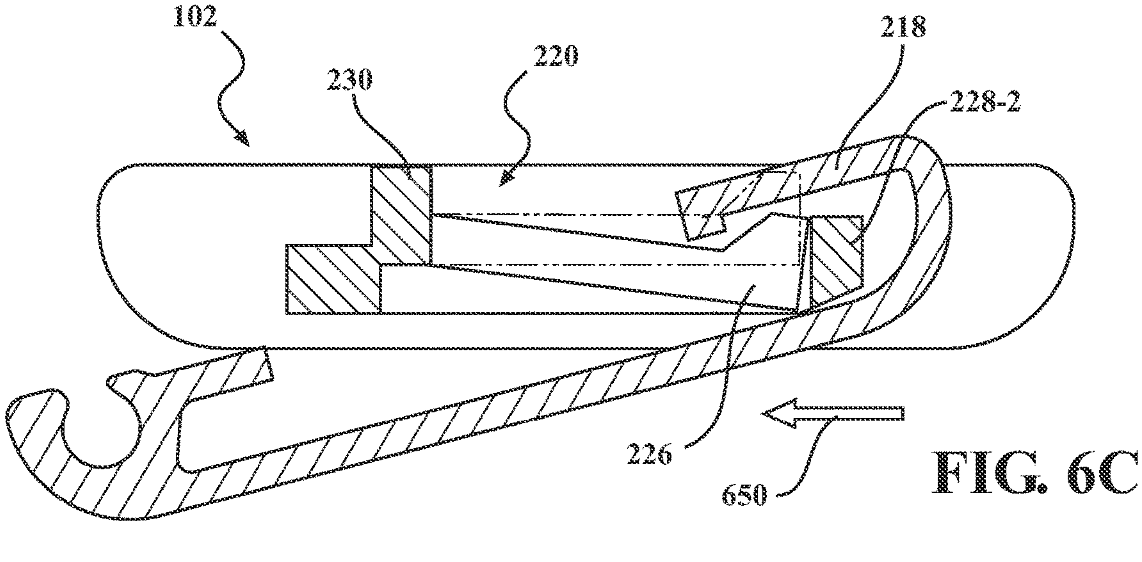

As depicted in FIG. 6C, the support bar 218 is translated further in the direction indicated by the first arrow 650. In FIG. 6C, however, the compliant clip 226 is deflected downward such that a portion of the drive shoe 220 may be inserted into the cavity of the support bar 218. The support bar 218 is translated until there is clearance between the leading edge of the drive shoe 220 and the leading edge of the slot 222, as depicted in FIG. 6C.

Figure 6D:
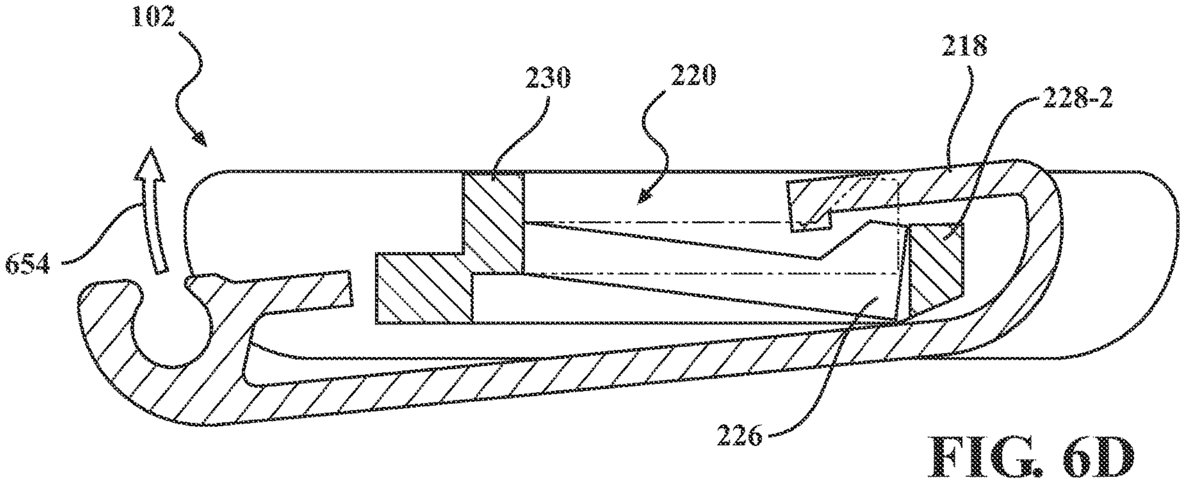
Figure 6E:
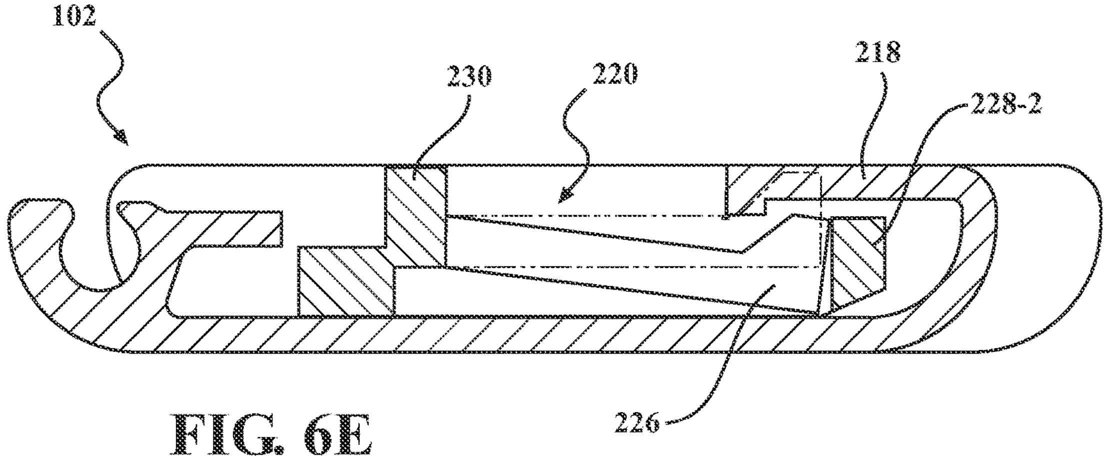

Once the leading edge of the drive shoe 220 is clear of the leading edge of the slot 222, the support bar 218 may be rotated as depicted in FIG. 6D by the third arrow 654 until the base section of the drive shoe 220 is within the cavity of the support bar as depicted in FIG. 6E. In this arrangement, the entire base section of the drive shoe 220 is within the cavity of the support bar 218.

Figure 6F:
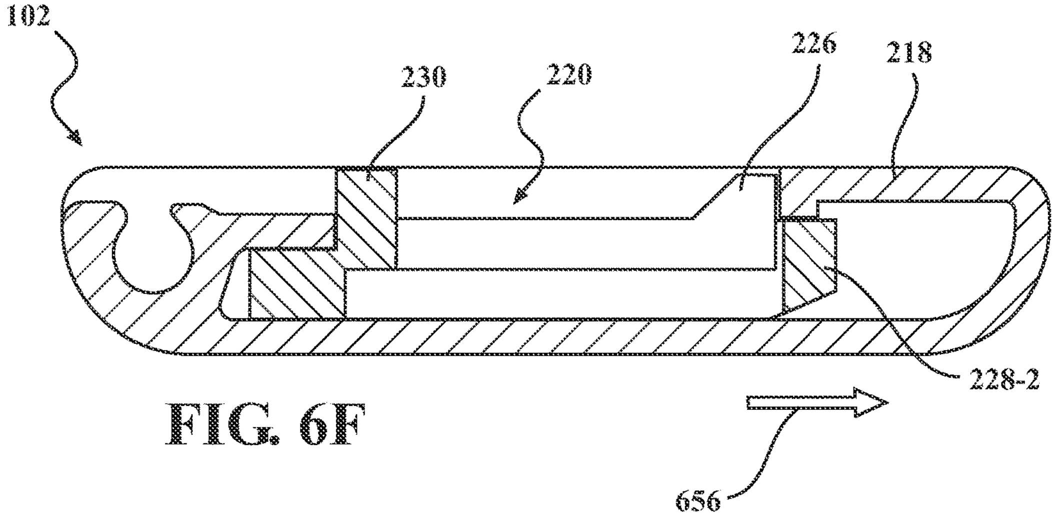

As depicted in FIG. 6F, the support bar 218 is translated longitudinally backward as indicated by the fourth arrow 656 until the compliant clip 226 is free to rebound to a state depicted in FIG. 6F. As depicted in FIG. 6F, the distance from the leading edge of the rib 230 to the trailing edge of the compliant clip 226 may match the length of the slot 222 such that the rib/slot leading edge interface and the compliant clip/slot trailing edge interface retain the slot 222 in position in the longitudinal direction 114.

The arrangements described herein have the benefit of providing a sunshade assembly 102 that has a lower height profile so as to fit entirely below the sunroof seal 332 of a sunroof assembly 110 and to provide adequate access to a glass attachment device 548 of the sunroof assembly 110. By not requiring guide rail milling to provide glass attachment device 548 access, the sunshade assembly 102 described herein may improve the efficiency and efficacy of sunroof assembly 110 manufacturing, improving the packaging of the sunroof assembly 110, and decreasing the total cost of the sunroof assembly 110.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6F, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

In this description, in one arrangement, the compartments of the vehicle include a passenger compartment, an engine compartment, a cargo area, and the like. Among other things, in one arrangement, the vehicle includes seats, a dash assembly, an instrument panel, controls, and the like housed in the passenger compartment. Additionally, in some instances, the vehicle may include an engine, a motor, a transmission, and the like, as well as other powertrain components, such as wheels, housed in the engine compartment and elsewhere in the vehicle. The wheels support the remainder of the vehicle on the ground. One, some or all of the wheels are powered by the remainder of the powertrain components to drive the vehicle along the ground.

Aspects herein can be embodied in other forms without departing from the spirit or essential attributes thereof. Accordingly, reference should be made to the following claims, rather than to the foregoing specification, as indicating the scope hereof.

What is claimed is:

1. A sunshade assembly, comprising:

a support bar spanning a width of a vehicle sunroof, the support bar comprising:

a sunshade grip to retain an edge of a sunshade; and a slot formed at either end of the support bar; and a pair of drive shoes to drive the support bar, a drive shoe:

is positioned within a cavity of the support bar; and comprises a compliant clip to retain the drive shoe within the slot, the support bar and the drive shoes have a height profile disposed below a sunroof seal and glass attachment access region of a sunroof assembly.

2. The sunshade assembly of claim 1, wherein the height profile of the support bar and the drive shoes is less than ten millimeters (mm).

3. The sunshade assembly of claim 1, wherein the support bar traverses a path in a longitudinal direction of the sunroof assembly that is greater than a length of the sunroof assembly.

4. The sunshade assembly of claim 1, wherein the support bar, when the sunshade is fully extended, is in front of a sunroof opening of the sunroof assembly in a longitudinal direction.

5. The sunshade assembly of claim 1, wherein:

the drive shoe further comprises:

a base surface; and a rib extending vertically from the base surface, the rib interfacing with a leading surface of the slot to retain the drive shoe in place when the drive shoe is seated within the cavity of the support bar; and the compliant clip is attached to and extends perpendicularly away from the rib towards a trailing surface of the slot.

6. The sunshade assembly of claim 5, wherein:

the compliant clip is positioned between side portions of the base surface; and the compliant clip is elevated from the side portions.

7. The sunshade assembly of claim 5, wherein the compliant clip:

deflects under the trailing surface of the slot within the cavity of the support bar during installation; and rests against the trailing surface of the slot when seated within the cavity of the support bar.

8. The sunshade assembly of claim 5, wherein:

the base surface of the compliant clip is longer than the slot of the support bar in a length direction; and the drive shoe is rotated into position within the slot during installation.

9. The sunshade assembly of claim 1, wherein a gap between the glass attachment access region and the support bar is at least 3.5 mm.

10. The sunshade assembly of claim 1, wherein the height profile of the support bar and the drive shoes is greater than seven millimeters (mm).

11. The sunshade assembly of claim 10, wherein the support bar:

traverses a path in a longitudinal direction of the sunroof assembly that is greater than a length of the sunroof assembly; and is in front of a sunroof opening of the sunroof assembly in the longitudinal direction when the sunshade is fully extended.

12. The sunshade assembly of claim 10, wherein:

the drive shoe further comprises:

a base surface; and a rib extending vertically from the base surface, the rib interfacing with a leading surface of the slot to retain the drive shoe in place when seated in the cavity of the support bar; and the compliant clip is attached to and extends perpendicularly away from the rib towards a trailing surface of the slot.

13. The sunshade assembly of claim 12, wherein the compliant clip:

deflects under the trailing surface of the slot within the cavity of the support bar during installation; and rests against the trailing surface of the slot when seated in the cavity of the support bar.

14. The sunshade assembly of claim 12, wherein:

the base surface of the compliant clip is longer than the slot of the support bar in a length direction; and the drive shoe is rotated into position within the slot during installation.

15. A sunshade assembly, comprising:

a support bar spanning a width of a vehicle sunroof, the support bar comprising:

a sunshade grip to retain a leading edge of a sunshade; and a slot formed at either end of the support bar; and a pair of drive shoes to drive the support bar, a drive shoe:

is positioned within a cavity of the support bar; and comprises a compliant clip to retain the drive shoe within the slot, the support bar and the drive shoes:

have a height profile of less than ten millimeters (mm); and are disposed below a sunroof seal and glass attachment access region of a sunroof assembly.

16. A sunshade assembly, comprising:

a support bar spanning a width of a vehicle sunroof, the support bar comprising:

a sunshade grip to retain a leading edge of a sunshade; and a slot formed at either end of the support bar;

a pair of drive shoes to drive the support bar, a drive shoe:

is positioned within a cavity of the support bar; and comprises a compliant clip to retain the drive shoe within the slot, the support bar and the drive shoes:

have a height profile of less than ten millimeters (mm); and are disposed below a sunroof seal and a glass attachment access region of a sunroof assembly; and a guide rail on either side of the support bar to support movement of the drive shoes, a guide rail height profile is disposed below the sunroof seal and the glass attachment access region of the sunroof assembly.

17. The sunshade assembly of claim 16, wherein:

the drive shoe further comprises:

a base surface; and a rib extending vertically from the base surface, the rib interfacing with a leading surface of the slot to retain the drive shoe in place when seated in the cavity of the support bar; and the compliant clip is attached to and extends perpendicularly away from the rib towards a trailing surface of the slot.

18. The sunshade assembly of claim 17, wherein the compliant clip:

deflects under the trailing surface of the slot within the cavity of the support bar during installation; and rests against the trailing surface of the slot when seated in the cavity of the support bar.

19. The sunshade assembly of claim 17, wherein:

the base surface of the compliant clip is longer than the slot of the support bar in a length direction; and the drive shoe is rotated into position within the slot during installation.

20. The sunshade assembly of claim 16, wherein the drive shoes further comprise a portion to slide within the guide rail.

* * * * *